3,134,687
WRAPPING AND PACKING MATERIAL HAVING A PRESERVING EFFECT

Erich Lück, Wiesbaden, Germany, assignor to Farbwerke Hoechst Aktiengesellschaft vormals Meister Lucius & Brüning, Frankfurt am Main, Germany, a corporation of Germany
No Drawing. Filed Mar. 8, 1960, Ser. No. 13,442
Claims priority, application Germany Mar. 13, 1959
1 Claim. (Cl. 117—155)

The present invention is a further development of the subject matter of U.S. patent application Ser. No. 784,846, filed January 5, 1959, now abandoned. This patent application relates to a process for the preparation of wrapping and packing material having a preserving effect, in particular for foodstuffs, which consists in impregnating the wrapping and packing material with calcium sorbate or in causing this salt to precipitate on the said material.

In further developing the process of the above invention, we have now found that a wrapping and packing material having a preserving effect can also be prepared by fixing onto the material 0.5–20 g., preferably 2–10 g., of calcium sorbate per m.$^2$ by means of a suitable carrier substance, for example, polyvinyl acetate.

As carrier substances, there may be used aqueous solutions or dispersions, hereinafter referred to as "liquids," that contain water-swellable cellulose derivatives, alginates, hydrolyzed starch derivatives, polyvinyl acetate or the copolymers thereof, polyacrylic acid esters, polymethacrylic acid esters, and the copolymers thereof, polyvinyl alcohol, butadiene-styrene-copolymers, polyisobutylene, chlorinated poly-olefines of high molecular weight, as well as drying oils and their combination products with natural or artificial resins, waxes, wax emulsions, resins, paraffins, fats or substances having fat-like or wax-like consistency.

The mixture of calcium sorbate and carrier required for the coating is prepared advantageously by adding, while stirring, an aqueous solution of a calcium salt, for example, calcium chloride to the liquid containing the carrier, and further adding this mixture with the stoichiometrical quantity of an aqueous solution of a sorbate, whereby the calcium sorbate is caused to precipitate in very fine distribution.

It is also possible first to add the liquid with a water-soluble sorbate and then by adding an aqueous solution of the calcium salt to cause the calcium sorbate to precipitate.

Further, the liquid may also be directly added with an aqueous suspension of calcium sorbate.

A further possibility of carrying out the process consists in pasting the liquid containing the carrier with the calcium sorbate and then making it up to the required consistency by adding water. The concentration of the calcium salt solution may range between 40 and 60%, that of the sorbate solution between 20 and 50%, and that of the liquid containing the carrier between 50 and 70%. However, the aforementioned concentrations do not constitute limit values.

The total content of dissolved or suspended substances in the mixture ready for coating can be varied according to the requirements; in general, it is adjusted to 20–40%.

The material can be coated with the above described mixture by the methods conventionally applied in the paper industry, and subsequently dried, while so adjusting the quantity of the mixture that the finished wrapping and packing material contains 0.5–20 g., preferably 2–10 g., of calcium sorbate and 1–20 g., preferably 5–15 g., of a carrier substance. After drying, the mixture of the present invention adheres solidly to the material and thus secures reliable preservation. Drying is effected preferably by means of heat or infrared radiation.

The process of the present invention offers especially for the paper industry the advantage that it can be carried out without ado with the coating machines available in the plants and that it does not require any change of the manufacturing process.

The following examples illustrate the invention but they are not intended to limit it thereto:

Example 1

4.2 kg. of a polyvinyl acetate dispersion of 56% strength are mixed with an aqueous solution of calcium chloride of 50% strength. This mixture is added portion-wise with 15 kg. of an aqueous sodium sorbate solution corresponding to a sorbic acid solution of 20% strength, whereby the calcium sorbate is caused to precipitate in very fine distribution.

Example 2

1.4 kg. of a polyvinyl acetate dispersion of 56% strength is mixed with an aqueous solution of 50% strength of potassium sorbate, diluted with 4 kg. of water, and added, while stirring, with 0.84 kg. of a 50% aqueous solution of calcium chloride in order to cause precipitation of the calcium sorbate.

Example 3

4.2 kg. of an aqueous dispersion of polyvinyl acetate of 56% strength are pasted with 2.7 kg. of calcium sorbate. 5 kg. of water are then added gradually in order to improve the brushability of the mixture.

Example 4

1 m.$^2$ of parchment paper is coated by rollers with 70 g. of a mixture obtained according to any of the Examples 1–3 and then dried by infrared radiation. The parchment paper so treated then contains about 7 g. of polyvinyl acetate and 10 g. of calcium sorbate.

We claim:

A wrapping and packing material adapted to the preservation of foodstuffs and comprising a substrate material having thereon a surface coating consisting essentially of 0.5–20 grams of finely divided particles of calcium sorbate, per square meter of surface area, dispersed throughout 1–20 grams of polyvinyl acetate per square meter of surface area, said calcium sorbate and polyvinyl acetate being deposited on said substrate material from an aqueous dispersion of these substances in admixture.

References Cited in the file of this patent
UNITED STATES PATENTS

| | | |
|---|---|---|
| 225,718 | Page | Mar. 23, 1880 |
| 1,944,323 | Kilching | Jan. 23, 1934 |
| 2,379,294 | Gooding | June 26, 1945 |
| 2,574,526 | Borden | Nov. 13, 1951 |
| 2,593,146 | Howard | Apr. 15, 1952 |
| 2,865,764 | Gorsica | Dec. 23, 1958 |
| 2,906,646 | Smith | Sept. 29, 1959 |
| 2,966,440 | Gerolt | Dec. 27, 1960 |
| 2,979,410 | Parlour | Apr. 11, 1961 |
| 3,090,689 | Tillet | May 21, 1963 |